(12) United States Patent
Birk et al.

(10) Patent No.: US 8,845,034 B2
(45) Date of Patent: Sep. 30, 2014

(54) BRUSH HEAD AND METHOD AND TOOL FOR PRODUCING SAME

(75) Inventors: Andreas Birk, Kronberg/Taunus (DE);
Lars Foerster, Kronberg/Taunus (DE);
Ulrich Pfeifer, Muenzenberg (DE);
Klaus Amsel, Schmitten (DE);
Guenther Alschweig, Eschborn (DE)

(73) Assignee: The Braun GmbH, Kronberg (DE)

( * ) Notice: Subject to any disclaimer, the term of this patent is extended or adjusted under 35 U.S.C. 154(b) by 125 days.

(21) Appl. No.: 13/517,698

(22) Filed: Jun. 14, 2012

(65) Prior Publication Data

US 2012/0317737 A1  Dec. 20, 2012

(30) Foreign Application Priority Data

Jun. 15, 2011  (EP) .................................... 1104870

(51) Int. Cl.
*A46D 3/00* (2006.01)
*A46B 3/06* (2006.01)

(52) U.S. Cl.
CPC .. *A46D 3/005* (2013.01); *A46B 3/06* (2013.01)
USPC ................. 300/21; 15/167.1; 15/193; 15/201

(58) Field of Classification Search
CPC ...................................................... A46D 3/005
USPC ............................ 300/21; 15/167.1, 193, 201
See application file for complete search history.

(56) References Cited

U.S. PATENT DOCUMENTS

| | | | | |
|---|---|---|---|---|
| 4,635,313 A | * | 1/1987 | Fassler et al. | 15/193 |
| 4,892,698 A | * | 1/1990 | Weihrauch | 264/243 |
| 5,823,633 A | * | 10/1998 | Weihrauch | 300/21 |
| 6,641,764 B2 | * | 11/2003 | Lanvers | 264/157 |
| 2011/0167579 A1 | * | 7/2011 | Huber et al. | 15/167.1 |

FOREIGN PATENT DOCUMENTS

| | | |
|---|---|---|
| DE | 845 933 | 6/1953 |
| DE | 199 32 377 A1 | 2/2001 |
| DE | 203 03 934 U1 | 7/2004 |
| DE | 10 2009 021482 A1 | 11/2010 |
| EP | 06 783 68 A1 | 10/1995 |
| EP | 113 0984 B1 | 4/2003 |
| EP | 119 4051 B1 | 10/2003 |
| EP | 1726 237 A1 | 11/2006 |

OTHER PUBLICATIONS

European Search Report for Z-8381FQ dated Nov. 9, 2011.
European Search Report for Z-8381FQ dated Jan. 11, 2012.

* cited by examiner

*Primary Examiner* — Mark Spisich
(74) *Attorney, Agent, or Firm* — Vladimir Vitenberg

(57) ABSTRACT

A brush head, particularly a toothbrush head, may have a plurality of cleaning elements, in particular bristle tufts, which are anchored by an end section in a brush carrier, wherein the cleaning elements may be cast with positive engagement in blind-hole shaped retaining recesses. For producing such a brush head different cleaning elements may be placed successively or simultaneously in different mold cavities and may be over-molded using different plastic materials from which injection-molding sections of the bristle carrier are formed in the process. In doing so, a first cleaning element is over-molded in a first mold cavity using a first plastic material, while a second cleaning element is over-molded in a second mold cavity using a second plastic material.

13 Claims, 13 Drawing Sheets

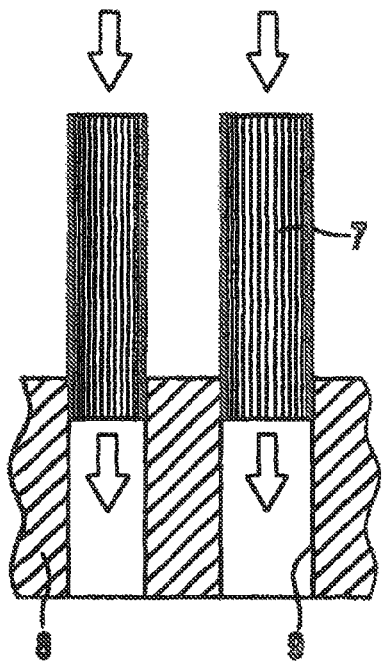
Fig. 2A
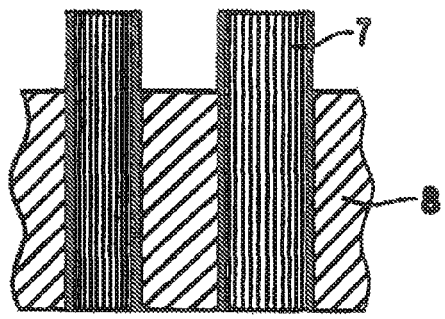
Fig. 2B
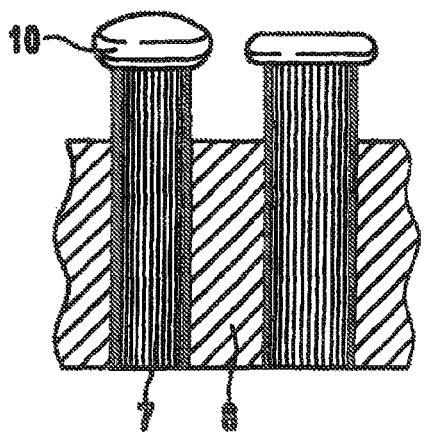
Fig. 3

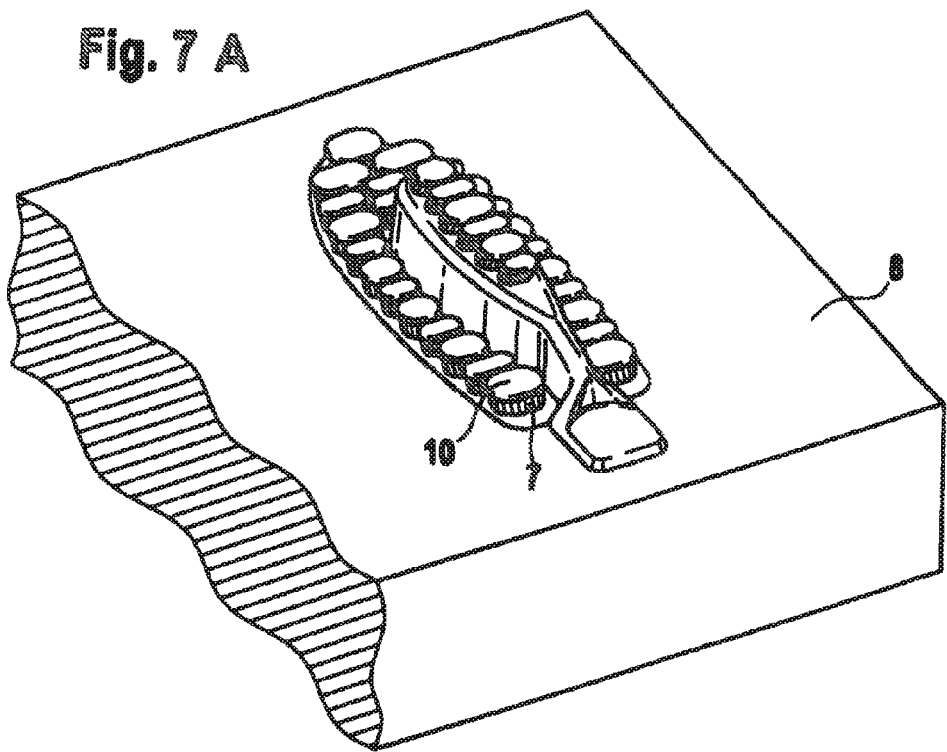
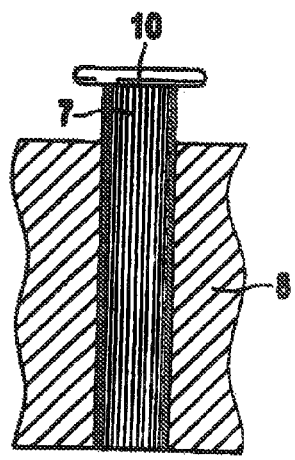

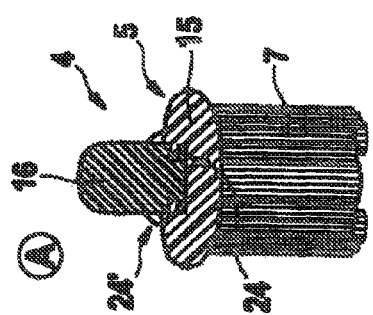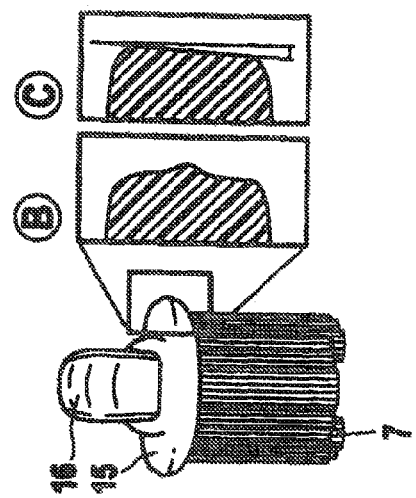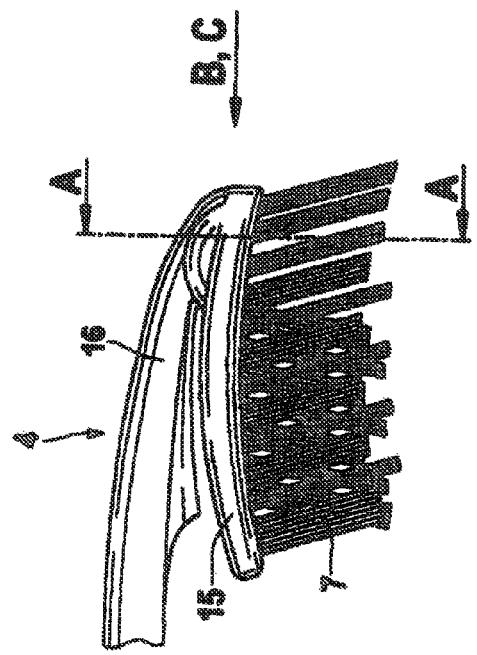

BRUSH HEAD AND METHOD AND TOOL FOR PRODUCING SAME

CROSS REFERENCE TO RELATED APPLICATIONS

This application claims the benefit of European Patent Convention Application No. 11004870.9, filed Jun. 15, 2011, the substance of which is incorporated by reference in its entirety herein.

FIELD OF THE INVENTION

A brush head, in particular a toothbrush head is described, having a plurality of cleaning elements, in particular bristle tufts, which are anchored by one of their ends in a bristle carrier, and wherein the cleaning elements are molded in blind-hole shaped retaining recesses in a form-closed manner. Further a method and a tool for producing a brush head, in particular a toothbrush head, are disclosed in which cleaning elements, in particular bristle tufts, are over-molded at one of their ends using a plastic material, from which a bristle carrier is formed at least partially in the process.

BACKGROUND OF THE INVENTION

Various methods are known in order to fasten the bristle tufts in the bristle carrier of toothbrushes, wherein usually injection-molding from plastic is used. There are known the so-called anchor tufting methods, in which the bristles of a tuft are bent, in the shape of a U, around a retaining web which is then driven into a blind hole. There are also known the so-called hot-tufting methods, in which the bristle tufts are anchored on the bristle carrier by means of a forming technique. Usually, the bristle tufts are melted at their ends to form thickenings and then are over-molded with plastic or cast into the head when the brush head is injection-molded. Such hot-tufting methods have various advantages, for example with respect to hygiene, because less bacteria can collect in the anchoring areas, or also with respect to the cross-sectional geometry of the bristle tufts, which can be designed in greater variety than with the anchor tufting methods. But, it is not easy to generate bristle fields with different properties in different areas using the hot-tufting method. In order to optimize the cleaning efficiency of toothbrushes, it may be helpful to provide different cleaning elements or bristle tufts in different sections of the bristle field. For example DE 10 2009 021 482 A1 describes a method, wherein bristle tufts and place holder elements are arranged in a bristle carrier and over-molded in order to fasten the bristle tufts in a brush head. Then the place holder elements are removed and another type of cleaning element can be injected instead of the place holder elements. It can be also helpful support cleaning elements or bristle tufts in a different manner, for example to support a portion thereof rigidly in a section of hard plastic and another portion thereof flexibly in a section of soft plastic. In addition, it may also be beneficial to melt the ends of differently composed bristle tufts, for example consisting of different bristle material, to different degrees, in order to achieve an optimum anchoring. However, this is difficult using hot-tufting methods which melt the ends of the tufts after the tufts have been configured into a bristle field, because the usually required application of heat to a bristle tuft always also affects adjacent tuft ends A hot-tufting method is known, in which the bristle tufts that are held ready in the form of a bristle field are melted at their ends to such an extent that the melted material of adjacent bristle tufts combines. The resulting flat support structure, which connects the bristle tufts, is intended to achieve an increased pull-out resistance. However, it is difficult in this case to use bristle tufts of differing bristle materials in order to achieve different properties in different bristle field sections, since different types of bristle materials cannot easily be fused together. This becomes even more difficult when not only bristle tufts but also differently designed cleaning elements, such as strips of soft plastic, are to be used and to be combined, for example, with bristle tufts. In addition, the flat support structure on the bottom of the bristle tufts inhibits quick filling of the mold cavities when the bristle carrier is injection-molded. Accordingly, there is a need for a toothbrush head and manufacturing method thereof, which allows for design flexibility, material flexibility, and support flexibility.

SUMMARY OF THE INVENTION

According to one aspect a method for producing a brush head, in particular a toothbrush head, is described, in which cleaning elements, in particular bristle tufts, are over-molded at one of their ends using a plastic material, wherein a bristle carrier is formed at least partially during said over-molding process, wherein at least two different cleaning elements selected from the group consisting of different types of cleaning elements, distinctive cleaning elements of the same type and a combination thereof are positioned successively or simultaneously in at least two different mold cavities in that the at least two different cleaning elements are over-molded using at least two different plastic materials in the at least two different mold cavities, wherein a first injection-molding section of the bristle carrier consisting of a first plastic material and a second injection-molding section of the bristle carrier consisting of a second plastic material are formed. According to another aspect a brush head, in particular a toothbrush head, is described having a plurality of cleaning elements, particularly bristle tufts, which are anchored with one end in a bristle carrier, wherein the cleaning elements are over-molded with injection-molding sections forming blind-hole shaped retaining recesses, wherein at least two different cleaning elements selected from the group consisting of different types of cleaning elements, distinctive cleaning elements of the same type and a combination thereof are anchored in at least two different injection-molding sections, wherein the at least first injection-molding section consists of a first plastic material and the at least second injection-molding section consists of a second plastic material.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

FIGS. 2A, 2B show a schematic sectional view of a carrier part for retaining the bristle tufts during the production process; insertion of the bristle tufts into the carrier part is shown in FIG. 2A, and the bristle tufts already in place are shown in FIG. 2B;

FIG. 3 shows a schematic sectional view illustrating the melting and thickening of the ends of the bristle tufts prior to the injection process;

FIG. 7A shows a schematic, perspective illustration of the finished reshaped end sections of the bristle tufts situated in the carrier part;

FIG. 7B shows a partial view, in an enlarged sectional view, of an individual finished reshaped bristle tuft;

FIG. 8 shows schematic sectional views through two bristle tufts cast in different injection-molding sections, the bristle tufts having ends of differing thicknesses, wherein partial view A) shows two injection-molding sections flush against one another, partial view B) shows two injection-molding sections set apart from one another by a gap, and partial view C) shows two injection-molding sections set apart from one another, the gap between the aforementioned injection-molding sections being filled in;

FIG. 11A shows a schematic side view of a toothbrush head in a side view;

FIG. 11B, shows, in section A-A according to FIG. 11A, a view A of the toothbrush head which has been manufactured using the die-slide concept according to FIG. 10;

FIG. 11C shows various undercut sections between the injection-molding sections in partial views B and C according to views B and C of FIG. 11A;

DETAILED DESCRIPTION OF THE INVENTION

Figure 1:
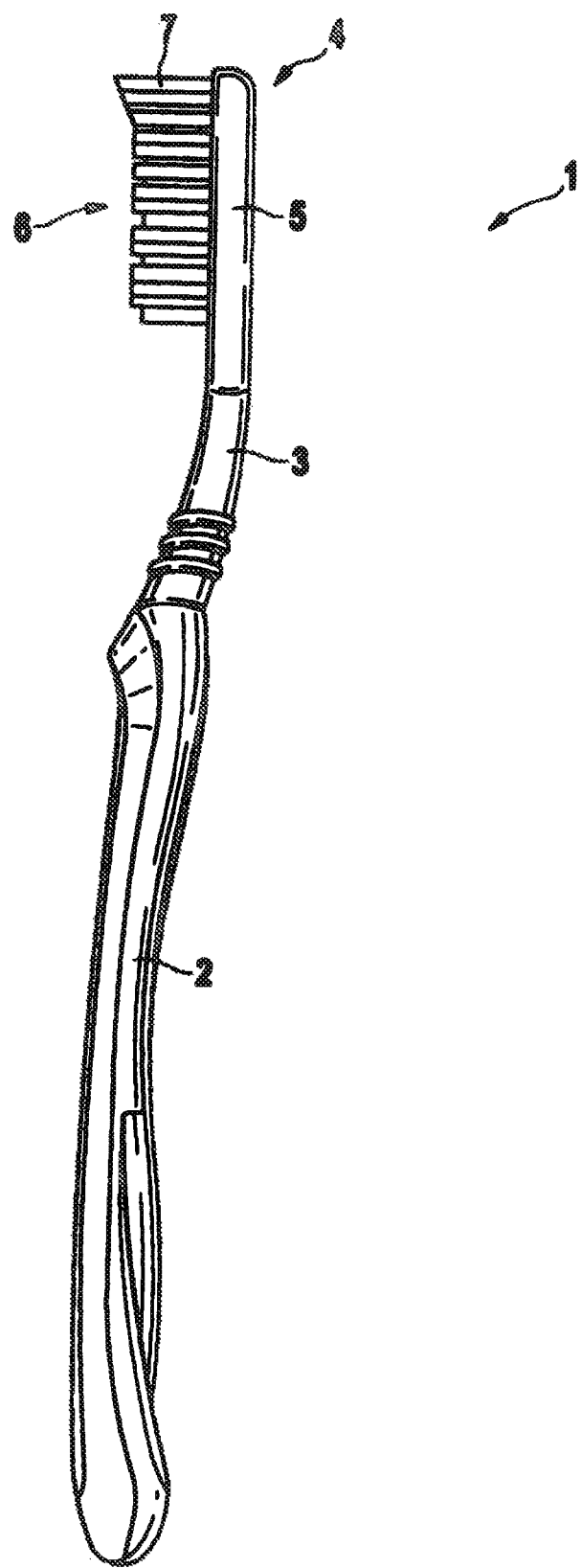
FIG. 1 shows a schematic side view of a toothbrush with a bristle field comprising a multiplicity of bristle tufts which are anchored in an injection-molded bristle carrier in a hot-tufting process.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The brush head and the method for the production thereof as disclosed herein, as well as an improved tool for the production of said brush head allow design flexibility, for example, in the positioning of cleaning elements and allows providing of different types of cleaning elements, including cleaning elements made from differing materials. An improved brush head may comprise, for example, a compact form and is efficient to produce, despite the complex design of the bristle field thereof, having, for example, differently designed cleaning elements. A method for producing a brush head, in particular a toothbrush head is shown, wherein cleaning elements, in particular bristle tufts, are over-molded at one of their ends using a plastic material. Varying cleaning elements can be fastened, independently of one another, in different injection-molding sections of materials of different physical or chemical material properties, independently of one another. This provides the cleaning elements with optimum support properties, independently of one another. "Different cleaning elements" as used herein shall be understood as two different types of cleaning elements or two distinctive cleaning elements of the same type or a combination thereof. "Different types of cleaning elements" as used herein shall be understood as cleaning elements differing at least in the material they are made from. An example for different types of cleaning elements may be bristles made of different materials or bristles and elastomeric elements. "Distinctive cleaning elements of the same type" as used herein shall be understood as cleaning elements which are made of the same material, but which are distinguishable from each other in at least one other property. Examples for these other properties in which the distinctive cleaning elements of the same type may differ are e.g. size, composition, form, outer shape, surface appearance or a combination thereof. An example for distinctive cleaning elements of the same type may be bristle tufts having different tuft diameters or having different tuft geometries, or bristles being tapered or crimpled compared to unmodified bristles. At least two different cleaning elements can be cast in at least two different injection-molding sections one made of a first material and one made of a second material, wherein the cleaning elements can be made from the same or different materials. The brush head may be thereby provided with differently formed anchoring sections. During said over-molding process parts of the bristle carrier are formed which are termed injection-molding sections. As the injection-molding sections are injection-molded from different materials the bristle carrier can be individually adapted to the requirements of the various cleaning elements so that every injection-molding section can optimally support each cleaning element. Different cleaning elements can be placed successively or simultaneously in different mold cavities to be over-molded. As a result a first cleaning element may be over-molded in a first mold cavity using a first plastic material, while a second cleaning element may be over-molded in a second mold cavity using a second plastic material. The cleaning elements may be held by at least one carrier part which has hole-shaped retaining recesses, in which the cleaning elements may be held during the process of over-molding. The position of the cleaning elements in the carrier part corresponds to the desired relative arrangement thereof with respect to one another on the brush head. Additionally, said carrier part may form a wall of the mold cavities, in which the ends of the cleaning elements extending out from the carrier part can be over-molded in a multi-component process. Owing to the use of the carrier part as part of the injection mold, the positioning of the ends of the cleaning elements to be over-molded as well as the opening and closing of the injection mold can be executed very simply and efficiently. The side of the carrier part facing the ends to be over-molded may form a negative mold for the cleaning-element-side or bristle-side surface of the bristle carrier of the brush head.

The cleaning elements can be transported from a first injection-molding station in which at least one part of a bristle carrier and/or a brush head is injection-molded to a second injection-molding station, in which at least another part of a bristle carrier and/or a brush head is injection-molded. Further steps of transportation to additional injection-molding stations in which additional parts of the bristle-carrier and/or the brush head can be injection-molded are also applicable to the method as described herein. Additionally, the cleaning elements may be located in the at least one carrier part during transportation. Thus, the aforementioned carrier part, in which the cleaning elements are arranged, may also used for handling and/or transporting of the cleaning elements in or between the different process steps. For example, the cleaning elements, arranged in the carrier part, may be positioned in various injection molds to mold different sections of the brush head. Alternatively or in addition, the cleaning elements may be arranged in the carrier part for an upstream process step, such as, for example, a thermal treatment for melting the ends of the cleaning elements to form thickenings. The carrier part may be also used as a part of the mold cavity for one or more of said injection-molding stations.

In order to over-mold different cleaning elements with different materials to form different retaining sections the ends of the other cleaning elements which are not intended to be over-molded may be protected or covered. Covering or protection may be necessary if the cleaning elements are placed in different injection molds for injecting a first and a second injection-molding section or in one injection-mold for injecting a first and a second injection-molding section. Different injection molds providing different mold cavities can be used for creating the different injection-molding sections on different cleaning elements. It is also possible to subdivide the mold cavity, such that different cavity sections can be filled using different materials. A plurality of injection-molding sections can also be injection-molded in one mold onto the various cleaning elements by covering sub-sections of an injection mold in each case. Thereby, at least during the process of over-molding a first cleaning element using a first plastic component, the surrounding area of a second cleaning element is covered with respect to the mold cavity, in which the aforementioned first cleaning element is over-molded. During molding of the second cleaning element, the previously over-molded first cleaning element and the injection-molding section molded thereon can be covered by a second mold part with respect to the cavity in which the second cleaning element is over-molded. The covering can be carried out by means of different mold parts that are placed in the injection mold, for example, slides may cover a section of a mold cavity. This makes it possible to mold two completely separate injection-molding sections onto different cleaning elements without moving the cleaning elements into different injection molds for this purpose. In an embodiment, the second cleaning element can be covered, for example, using a slide subdividing a mold cavity, in order to mold the first cleaning element using a first plastic material in the first part of the mold cavity. If the slide is then moved back, the remaining mold cavity can be injected around the second cleaning element using a second plastic material. In this case, the two injection-molding sections are connected to one another flush with one another.

The separating planes of various injection-molding sections can be arranged in different planes. If slides are used one or more slides may be moved-in or may be retract substantially transversely with respect to the longitudinal direction of the cleaning elements or bristle tufts, such that the injection-molding sections have separating planes that are perpendicular with respect to the longitudinal direction of the cleaning elements. Thereby the one or more slides may be flush with a section of the carrier part. If inclined cleaning elements or bristle tufts are used, the separating planes are inclined correspondingly acute-angled such that the separating planes of the injection-molding sections are oriented perpendicular with respect to the tilted bristle tufts. Additionally, the separating planes can essentially be oriented perpendicular with respect to the primary axis of the bristle field of the toothbrush head.

A plurality of slides can be used in succession that move into the respective mold cavity in different planes or at different elevations, such that injection-molding sections lying on top of one another and/or protruding at varying heights can be formed. Additionally, at least one undercut may be injection-molded onto at least one injection-molding section by using at least one slide.

The mold parts can be arranged moveable as well. For example one or more mold parts may be moved against the carrier part during injection molding. This movement may be substantially parallel to the longitudinal direction of the cleaning elements and said mold parts may be moved to be flush with the carrier part in the area of the cleaning elements.

The ends to be over-molded of the cleaning elements can be arranged in different planes, for example varyingly high or low in the bristle carrier. This makes it possible to achieve a particularly dense placement of or coverage with bristles or cleaning elements, even when the ends of the cleaning elements have thickenings. Owing to a positioning of the ends to be anchored in different planes, the different injection-molding sections that surround different cleaning elements can overlap with one another without this causing any mutual interference of the injection-molding sections and/or any interference in the process of over-molding the anchoring sections using a further bristle-carrier injection-molding component.

When positioning the ends of the cleaning elements to be over-molded at different levels, a retaining part is used for the positioning of said ends in the mold cavities. Said retaining part may be designed in relief-like manner and/or has projections. For example the retaining part can have raised sections around cleaning elements, which ends are intended to sit more deeply in the bristle carrier. Examples for suitable raised sections are chimney-like projections that project out as compared to the sections that surround cleaning elements arranged not so deeply in the bristle carrier. Owing to such projections in the carrier part, the cleaning elements can be sufficiently supported and/or the embed depth can be controlled, in the desired manner, independently of the depth of the ends of the cleaning elements. The aforementioned projections of the carrier part enable the aforementioned slides to move flush against the projections when moving in horizontally into the mold cavity or moving in transversely with respect to the longitudinal direction of the cleaning elements, thereby achieving a tight covering of the areas that are not to be over-molded.

Alternatively or in addition, vertical separating planes, i.e. separating planes substantially parallel with respect to the longitudinal direction of the cleaning elements and/or parallel with respect to the closing movement of the mold halves, can be provided for the different injection-molding sections that enclose different cleaning elements. If, for example, this is carried out using slides, same can be moved in vertically into the mold cavity in the aforementioned manner, in order to cover a section of the mold cavity that surrounds the end not to be over-molded of a cleaning element. Alternatively or in addition, different mold halves can be moved onto the carrier part in which the cleaning elements to be over-molded are situated, these mold halves having varyingly shaped mold cavities in order to create the different injection-molding sections that surround different cleaning elements.

Even with such a vertical die concept, it may be advantageous if the carrier part in which the cleaning elements to be over-molded are situated has projections in a direction, for example, parallel with respect to the longitudinal direction of the cleaning elements. The slides and/or mold halves may likewise have contact surfaces, with which they move onto the projections.

In order to increase the pull-out resistance of the cleaning elements from the bristle carrier, the cleaning elements may have thickenings at their cast ends. Said thickenings may be produced by thermal melting of the ends. The ends which are melted are the ends to be over-molded, i.e. said ends are not the ends for cleaning the teeth. Heat is applied to the cleaning elements at their ends to be over-molded, either individually or in groups in each case, and reshaped into a thickening. Generally, this can be carried out by means of various types of energy flows in the form of mass flows and/or radiation.

The reshaping of the ends of the cleaning elements can be carried out solely by means of the application of the heat, wherein, the effects of gravity can be utilized. Thereby, the cleaning elements with their ends to be melted are positioned pointing upward, such that a melted end section is pressed downward, thus resulting in a mushroom-shaped or drop-shaped thickening. Alternatively or in addition, a punching tool can be used to create the thickening. Said punching tool may be driven against the melted ends of the cleaning elements in order to reshape the heated ends accordingly. The punching tool can have various punching surfaces, the shapes of which are adapted in each case to one cleaning element or group of cleaning elements, and which only reshape individually the one cleaning element or one group of cleaning elements, respectively. This makes it possible for a plurality of cleaning elements to be individually reshaped by means of one punching tool having various punching surfaces. Various punching surfaces of the punching tool may be adjustable with respect to one another, in particular to be capable of being positioned in various planes with respect to one another. This makes it possible to create a punching tool pad of different punching surfaces which are positioned raised in relief-like manner at various heights, in order to enable reshaping of the ends of the cleaning elements, which ends are positioned at different heights.

In addition or alternatively a device is provided for carrying out the method as described above. Said device comprises at least a positioning unit for positioning successively or simultaneously at least two different types of cleaning elements or at least two distinctive cleaning elements of the same type or a combination thereof in at least two different mold cavities, an injection unit capable of injecting at least two different materials in the at least two different mold cavities and a heating unit for heating one end of the at least two different types of cleaning elements or at least two distinctive cleaning elements of the same type or a combination thereof. The end to be heated is the end to be over-molded. In addition or alternatively a brush head, for example a toothbrush head is disclosed having bristle tufts comprising at least two different types of cleaning elements or at least two distinctive cleaning elements of the same type or a combination thereof being cast as described above.

These and other features, which can form the subject matter of the invention irrespective of how they are summarized in the claims, optionally in sub-combination, individually or in combination with one another, will become apparent not only from the claims but also from the following description and the drawings, with the aid of which example embodiments are explained below.

The toothbrush 1 shown in FIG. 1 comprises a shaft-like handle 2, which is connected to a brush head 4 via a neck piece 3. The brush head 4 in this case comprises a bristle carrier 5 joined to the aforementioned neck piece 3 which supports a bristle field 6, which comprises a multiplicity of bristle tufts 7. Instead of the bristle tufts 7, or in combination with the bristle tufts 7, other cleaning elements could be provided, for example in the form of elastomer strips, sponge elements, or other tooth cleaning elements. In the embodiment shown, the toothbrush 1 is designed as a manual toothbrush; however, a motor-driven toothbrush could also have a correspondingly designed brush head.

The bristle tufts 7 can usually comprise a multiplicity of bristles or filaments that are combined to form a tuft 7. The bristles or filaments in this case are cut to the desired lengths, the free ends of the tufts optionally being tapered or rounded off as desired, which can occur on the finished toothbrush 1 or can also be effected before the bristle tufts 7 are anchored on the brush head 4.

FIGS. 2-14 show the fastening of the bristle tufts 7 on the bristle carrier 5. According to FIG. 2A, preconfigured, for example cut-to-length, bristle tufts 7 are first placed into a carrier part 8 which forms a part of the injection mold for injection molding the bristle carrier 5 or the brush head 4. As shown in FIG. 2A, the carrier part 8 comprises a multiplicity of receptacle recesses 9, which are designed in the form of a through-hole or a blind-hole and which accommodate the corresponding bristle tufts 7 with an accurately fitting. The receptacle recesses 9 may be arranged in a grid pattern that corresponds to the desired positioning of the bristle tufts 7 on the brush head 4. As shown in FIG. 2B, the bristle tufts 7 with their ends to be anchored protrude by a certain length beyond the carrier part 8, such that the aforementioned ends of the bristle tufts 7 can be positioned in the mold cavity of an injection mold, in order to be over-molded with plastic therein.

In order to achieve increased resistance of the bristle tufts 7 against being pulled from the bristle carrier 5, the ends of the bristle-tuft 7 to be embedded are first reshaped through application of heat energy 32 in order to form thickenings 10, as shown in FIG. 3.

Figure 4A:
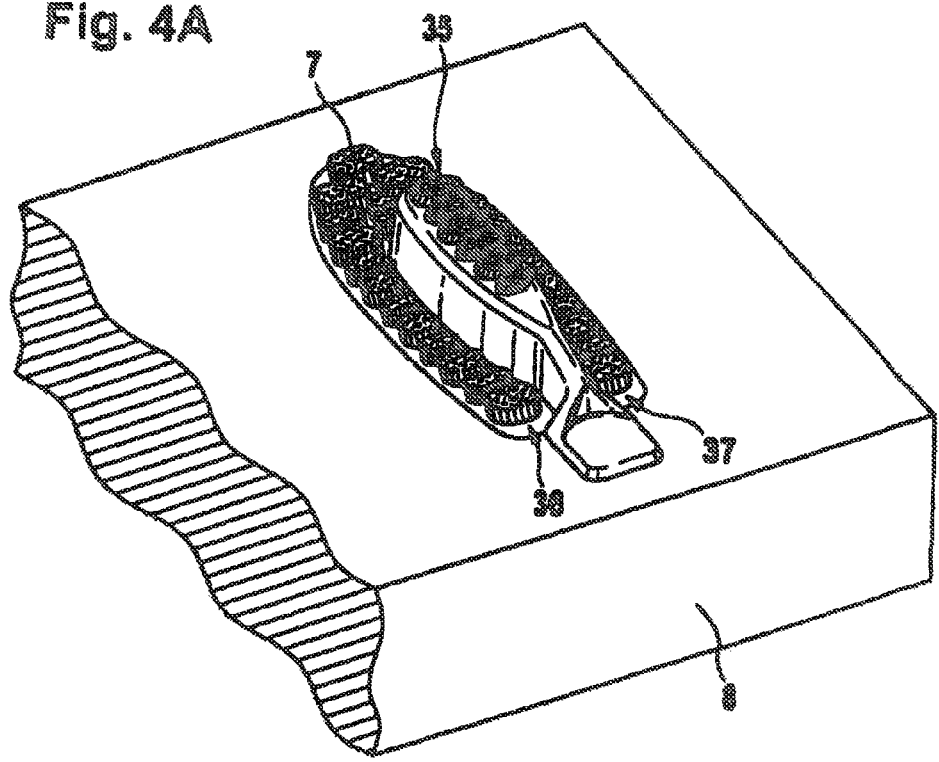
FIG. 4A shows a schematic, perspective illustration of the bristle tufts situated in the carrier part, which shows the positioning of the bristle tufts according to the subsequent arrangement thereof on the brush head.
Figure 4B:
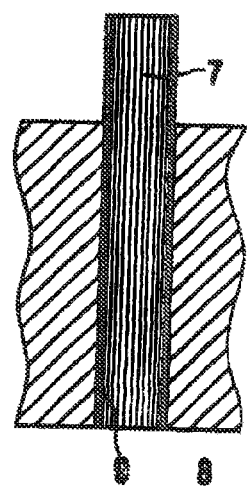
FIG. 4B shows, in a partial detail view, an enlarged sectional view of a bristle tuft in the carrier part according to FIG. 4A.

In order to produce the thickenings 10, the ends of the bristle tufts 7 protruding from the carrier part 8 are first melted through application of heat 32. FIGS. 4A and 4B show the initial state, in which the bristle tufts 7 are positioned in the carrier part 8, in the arrangement according to the bristle field 6 to be created, a still non-reshaped bristle tuft 7 being shown according to FIG. 4B. According to FIG. 4A, the ends to be melted of the bristle-tufts 7 are arranged in different planes so that the tuft ends define a three-dimensional arrangement, cf. FIG. 4a. In the embodiment shown, the ends of bristle tufts 7 of a center row 35 are positioned higher than the bristle tufts of rows 36, 37 lying on the outside. Identical or different amounts of heat can be applied to one or more adjacent bristle tufts 7.

Figure 5A:
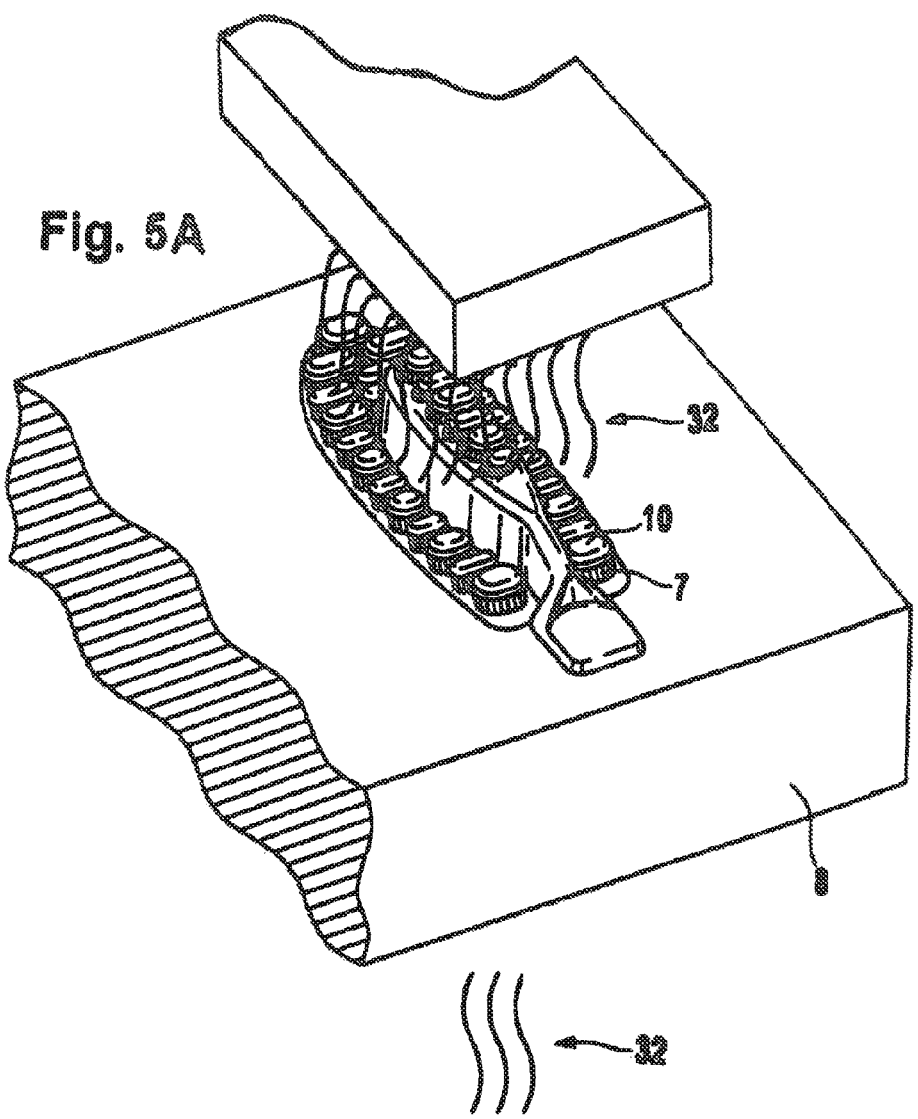
FIG. 5A shows a schematic, perspective illustration of the melting, through application of heat to the ends of the bristle tufts to be embedded, wherein the heating unit is shown in a working position.
Figure 5B:
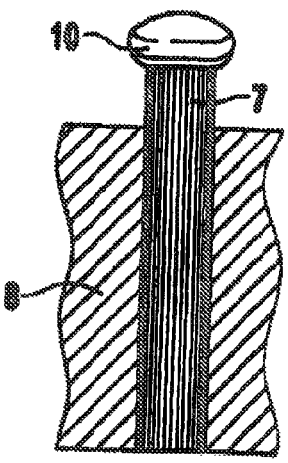
FIG. 5B shows, in a partial detail view, an enlarged sectional view of the bristle tuft in the carrier part according to FIG. 5A.

As FIG. 5 shows, the ends of the bristle tufts 7 are melted by the application of heat 32 to the extent that drop-shaped thickenings 10 form due to the effects of gravity and surface tension. The bristle tufts 7 are arranged in an essentially vertical orientation with the ends to be melted pointing upwards when the heat is applied. Bristle tufts can be arranged vertically or may be angled.

Due to the melting a corresponding increase in the pull-out resistance of the bristle tufts in a plastic material is achieved.

Figure 6A:
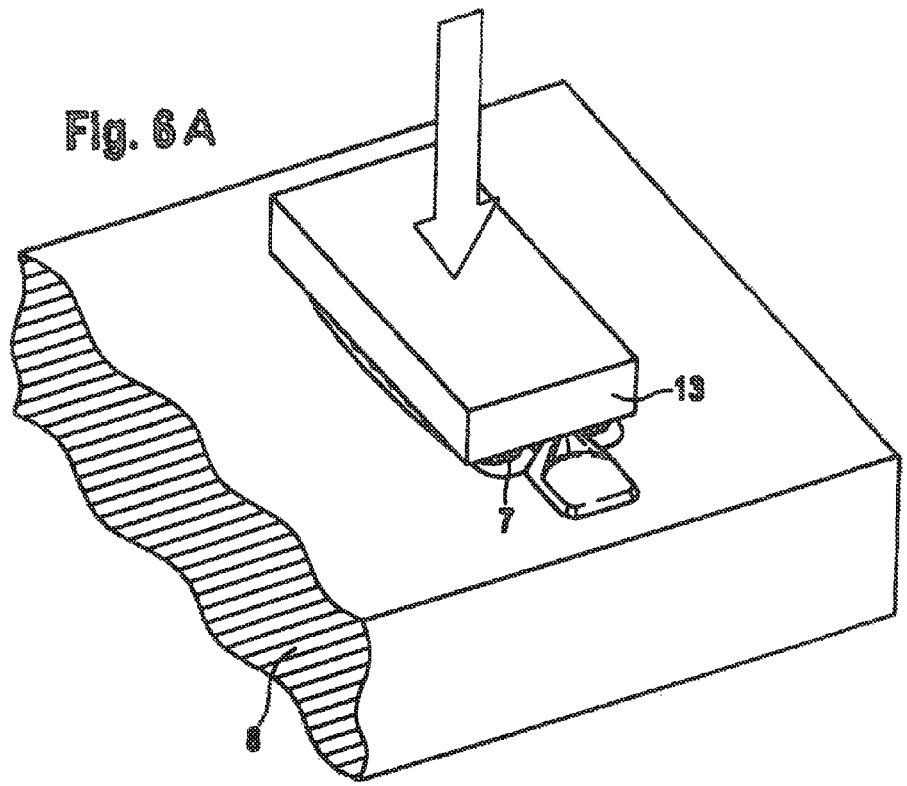
FIG. 6A shows a schematic, perspective illustration of the mechanical reshaping by means of a punching tool of the melted end sections of the bristle tufts situated in the carrier part.
Figure 6B:
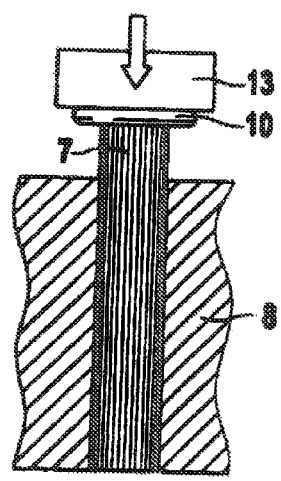
FIG. 6B shows a partial view, in an enlarged illustration, of a bristle tuft and the reshaping of the melted end section thereof by means of a section of the punching tool.

As shown in FIGS. 6 and 7, a mechanical reshaping of the melted thickenings 10 can be performed. To this end, a punching tool 13 is used which is moved up against the still-soft, malleable thickenings 10, in order to shape said thickenings 10 in the desired manner. As shown in the figures, a flat, disk-shaped thickening 10 is generated in such a way that a flat punching tool 13 is pressed on the front side against the ends of the tufts. Differently contoured punching surfaces can also be used to generate differently contoured thickenings.

Owing to a parallel reshaping process of all melted ends of the bristle tufts 7, same can be shaped in the desired way in a time-parallel manner, as shown in FIGS. 11A and 11B. In particular, thin, flat, and/or plate-shaped thickenings 10 can be created, even when the ends of the bristle tufts 7 are positioned in different planes and/or provided with different geometries and/or consist of various materials.

After forming the thickenings 10 by means of heat 32, the ends of the bristle tufts 7 can be anchored by over-molding in the bristle carrier 5; i.e., they are cast into the bristle carrier 5 during production thereof (see FIGS. 8 to 14).

Figure 8:
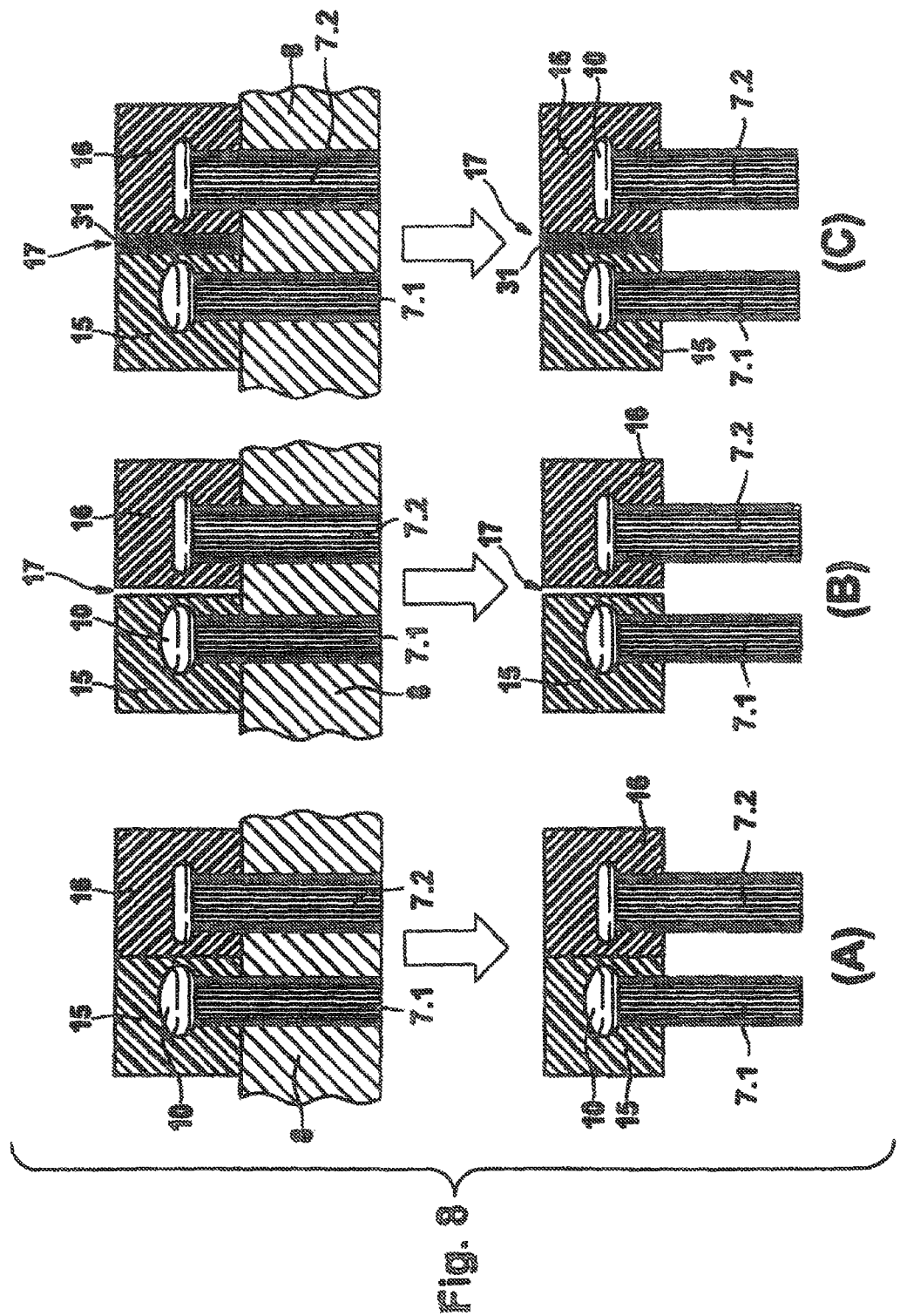

As shown in FIG. 8, different bristle tufts 7.1, 7.2 may be mounted into different injection-molding sections, 15 and 16; i.e., a first bristle tuft 7.1 or a first group of bristle tufts 7.1 is embedded in a first injection-molding section, while a second bristle tuft 7.2 or a second group of bristle tufts 7.2 is embedded in a second injection-molding section 16, and an $n^{th}$ bristle tuft 7 is embedded in an $n^{th}$ injection-molding section. Said injection molding sections form at least one portion of the bristle carrier 5. Said injection molding sections can be connected to an additional part of the bristle carrier 5. For example, the injection molding sections are materially bonded to said additional part of the bristle carrier 5. In addition or alternatively, the injection molding sections are connected to the additional part of the bristle carrier 5 in a form-closed manner, e.g. one of the injection-molding sections 15, 16 may have an undercut with respect to a normal on the cleaning-element-side surface of the bristle carrier 5.

According to FIG. 8, various designs are possible. The injection-molding sections, 15 and 16, in which different bristle tufts 7.1, 7.2 are embedded, may lie directly adjacent to one another and/or may lie flush against one another or may be, in a manner of speaking, cast against one another and/or may overlap with one another, wherein the overlap is for example transversely with respect to the longitudinal axis of the cleaning elements. Alternatively or in addition, injection-molding sections can be provided that are separated from one another by a groove 17, such that the corresponding injection-molding sections are designed to be wholly separate from one another, cf. FIG. 8 B. Alternatively or in addition, the bristle carrier 5 may also have injection-molding sections with bristle tufts embedded therein which are separated from one another by a groove 17, wherein the groove 17, however, may be filled in with a plastic or an adhesive mass 31, cf. FIG. 8 C.

The injection-molding sections, 15 and 16, in which different bristle tufts 7.1, 7.2 are embedded, can in particular consist of different plastic materials which have different physical and/or chemical properties. For example, a first bristle tufts 7.1 can be cast into a hard plastic while a second bristle tufts 7.2 may be embedded in a soft plastic.

As shown in FIG. 8, it is also possible to design the thickenings 10 of the bristle tufts 7.1, 7.2 to be different from one another. Thus, the anchoring properties can be individually adjusted to the respective injection-molding section, for example thickenings 10 that project further out can be provided for being embedded in a soft plastic, while thickenings with less lateral protrusion may be adequate for embedding in hard plastic.

Figure 9:
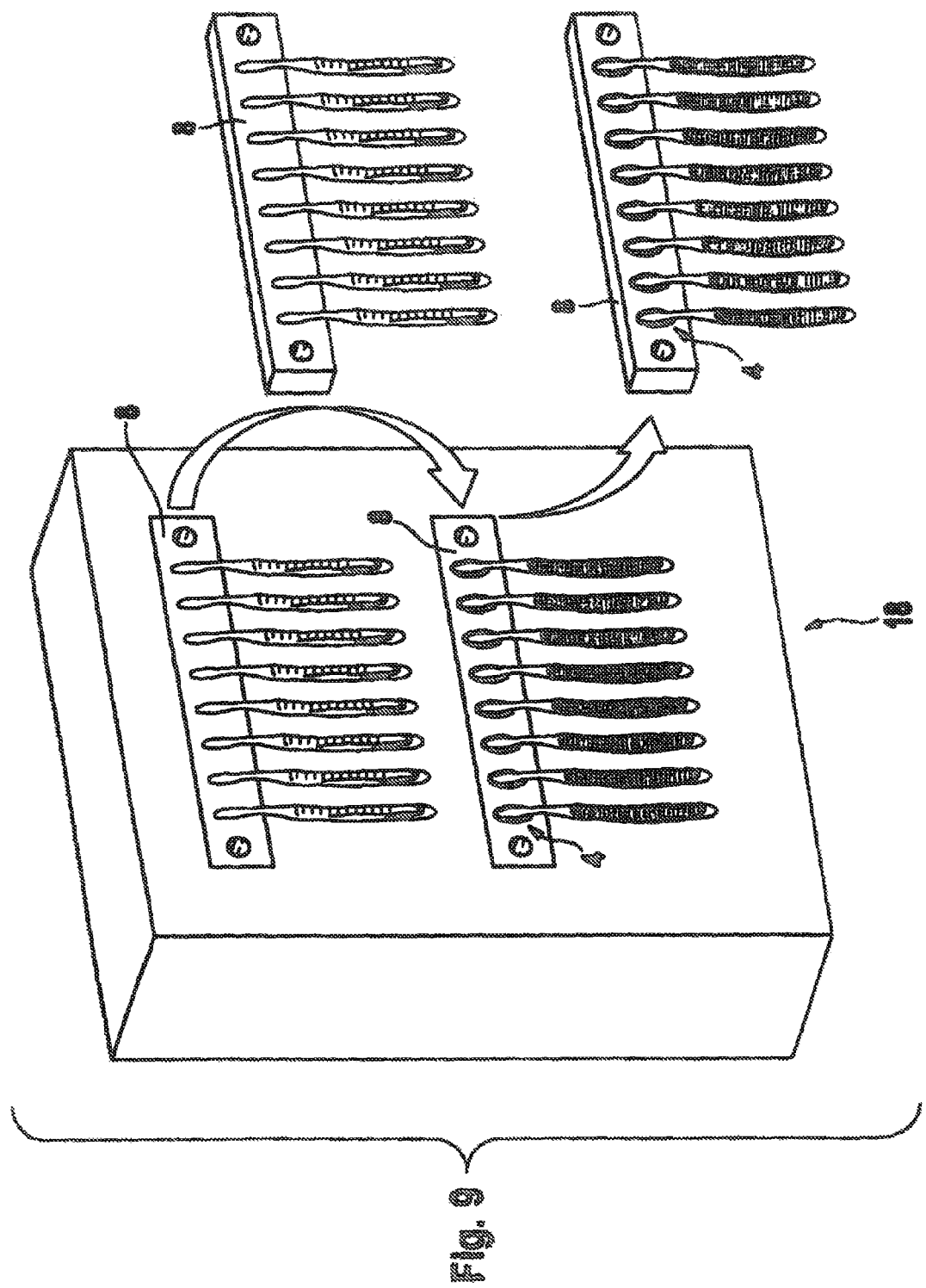
FIG. 9 shows a schematic, perspective illustration of an injection die having two mold cavities for injection molding of two separate brush head sections, the bristle tufts being transported from one mold cavity to the other mold cavity while situated in a carrier part, placed against the respective half of the mold, and then removed from same.
Figure 10:
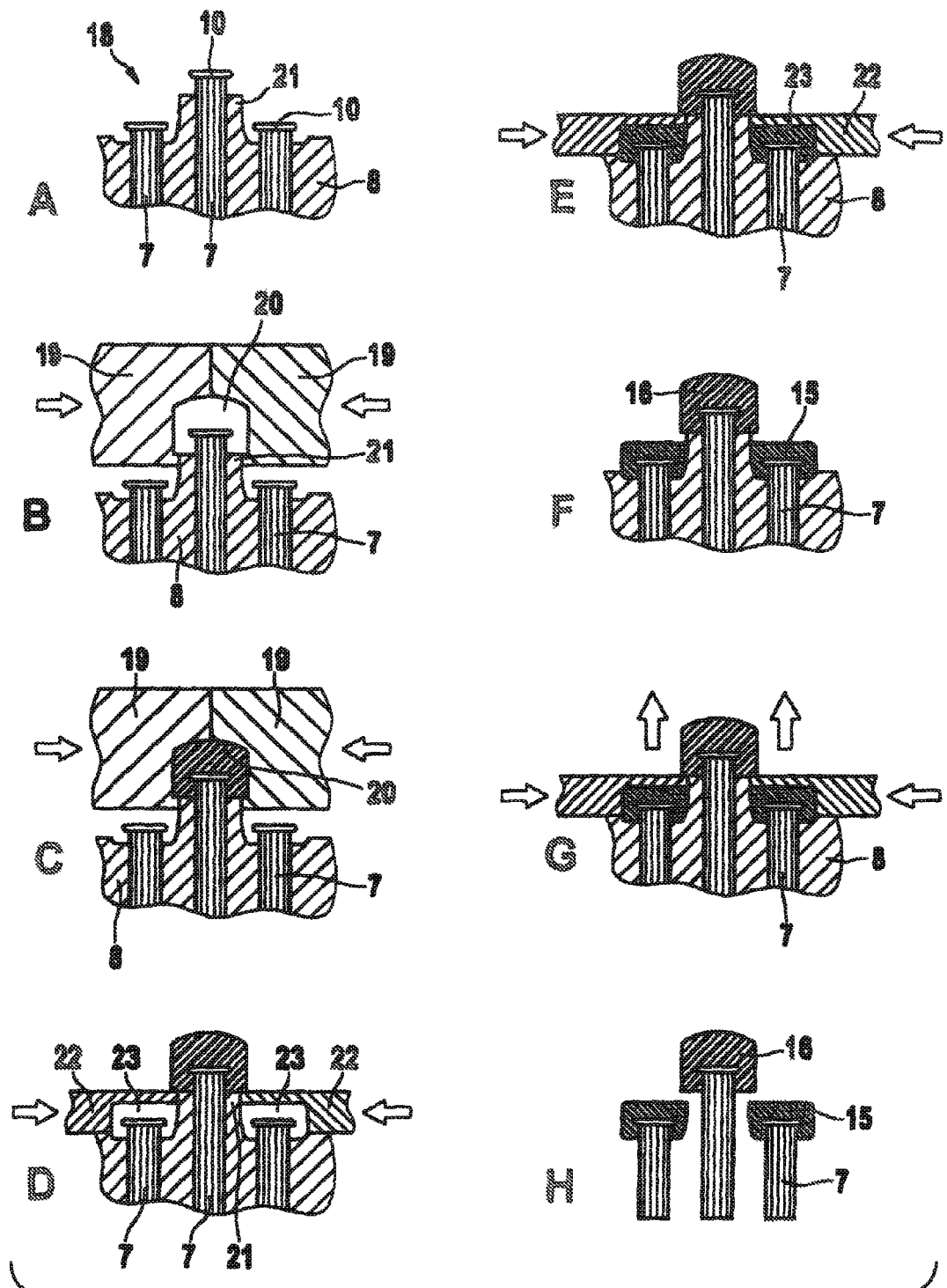
FIG. 10 shows schematic sectional views through three bristle tufts being held in a carrier part in different phases A to H of a multi-component injection-molding process, wherein the injection molding sections are formed successively, and wherein the different illustrations show the different slides and the different sub-molding processes, a so-called horizontal die concept being shown with slides that are movable transversely with respect to the longitudinal direction of the bristle tufts.

As shown in FIG. 10, the bristle tufts 7 may remain in the carrier part 8 in order to be transported back and forth between various injection-molding stations and/or mold cavities. In FIG. 9, the carrier part 8 populated with bristle tufts 7 is first inserted in the upper station of the injection mold 18, in which a first component is injection-molded onto the brush head 4. The carrier part 8 in this case advantageously forms a mold part that closes the injection mold 18. The mold then opens and the bristle tufts 7 with a plastic part injection-molded thereto are inserted by means of the carrier part 8 into the lower station of the injection mold 18, in which a second component is then injection-molded on.

The injection-molding of the bristle carrier 5 to the bristle tufts 7 can generally take place in various ways. FIG. 10 shows an embodiment, according to which slides 19 are used which can be moved transversely with respect to the longitudinal direction of the bristle tufts.

As the partial view A in FIG. 10 shows, a carrier part 8 provided with bristle tufts 7 is first inserted into the injection mold 18. Different bristle tufts 7 being positioned for example with their ends in different planes. This enables a particularly dense bristle population to be achieved without the fastening sections impeding one another. Thus, adequately dimensioned fastening sections can be provided without having space problems. In addition, the arrangement of the bristle ends in different planes enables the support properties to be controlled in a targeted manner as well. According to the partial view B in FIG. 10, slides 19 are then moved into in the mold 18 transversely with respect to the longitudinal direction of the bristle tufts, in order to form a first mold cavity 20, which extends over the end of a first bristle tuft, and separates the latter from the mold cavity over the other bristle tufts thereby covering the other bristle tufts which are supposed to be over-molded using another plastic component. The slides 19 may move against a raised section 21 of the carrier part 8 which surrounds the bristle tuft 7 to be over-molded, cf. partial view B of FIG. 10, such that a sealed mold cavity 20 is formed around the end of the bristle tuft 7 to be over-molded. According to partial view C, the respective plastic material is then injected into this first mold cavity 20 in order to over-mold the bristle tuft 7 placed therein. As the partial view D of FIG. 10 shows, the slides 19 are then moved away and second slides 22 are, in turn, moved into the mold 18 transversely with respect to the longitudinal direction of the bristle tufts 7, such that a second mold cavity 23 is formed around the bristle tufts 7 which were covered during the first injection molding operation. The slides 22 once again move against the raised section 21 in order to seal off the mold cavity 23, namely opposite the area that is not supposed to be over-molded.

After the second plastic material has been injected into the second mold cavity 23 according to the partial view E of FIG. 10, the slides 22 are moved away, as it is shown in partial view F. The finished product can be transferred to a removal device while being held in the carrier part 8.

The slides which may be moved again in transversely with respect to the longitudinal direction of the bristle tufts 7 can provide a gripping function under undercuts in the injection-molding sections 15 or 16, in order to pull the bristle tufts 7 together with the parts of the bristle carrier 5 out of the carrier part 8; cf. FIG. 10, partial views G and H therein. Owing to the tool concept shown in FIG. 10, undercuts can be created in a particularly simple manner with respect to the longitudinal direction of the bristle tufts 7, which enable the brush heads 4 to be removed from the carrier part 8 in a particularly simple manner. Such undercuts may be used to enable a defined gripping and pulling process for removing the brush heads 4. Such undercut contours are shown, for example, in partial views B and C of FIG. 11C. Alternatively or in addition, the aforementioned undercuts can also be used to design the connection of the components, as is shown, for example, in partial view A of FIG. 11B, such that a secure connection of injection-molding sections 15 and 16 is ensured, even when these components would otherwise not enter into any kind of chemical bond. Partial view A in FIG. 11B shows a section of the two-component brush head 4 connected by undercuts 24 and 24'.

As shown in FIG. 10, the bristle tufts 7 may remain in the carrier part 8 in order to be transported back and forth between various injection-molding stations and/or mold cavities. In FIG. 9, the carrier part 8 populated with bristle tufts 7 is first inserted in the upper station of the injection mold 18, in which a first component is injection-molded onto the brush head 4. The carrier part 8 in this case advantageously forms a mold part that closes the injection mold 18. The mold then opens and the bristle tufts 7 with a plastic part injection-molded thereto are inserted by means of the carrier part 8 into the lower station of the injection mold 18, in which a second component is then injection-molded on.

The injection-molding of the bristle carrier 5 to the bristle tufts 7 can generally take place in various ways. FIG. 10 shows an embodiment, according to which slides 19 are used which can be moved transversely with respect to the longitudinal direction of the bristle tufts.

As the partial view A in FIG. 10 shows, a carrier part 8 provided with bristle tufts 7 is first inserted into the injection mold 18. Different bristle tufts 7 being positioned for example with their ends in different planes. This enables a particularly dense bristle population to be achieved without the fastening sections impeding one another. Thus, adequately dimensioned fastening sections can be provided without having space problems. In addition, the arrangement of the bristle ends in different planes enables the support properties to be controlled in a targeted manner as well. According to the partial view B in FIG. 10, slides 19 are then moved into in the mold 18 transversely with respect to the longitudinal direction of the bristle tufts, in order to form a first mold cavity 20, which extends over the end of a first bristle tuft, and separates the latter from the mold cavity over the other bristle tufts thereby covering the other bristle tufts which are supposed to be over-molded using another plastic component. The slides 19 may move against a raised section 21 of the carrier part 8 which surrounds the bristle tuft 7 to be over-molded, cf. partial view B of FIG. 10, such that a sealed mold cavity 20 is formed around the end of the bristle tuft 7 to be over-molded. According to partial view C, the respective plastic material is then injected into this first mold cavity 20 in order to over-mold the bristle tuft 7 placed therein. As the partial view D of FIG. 10 shows, the slides 19 are then moved away and second slides 22 are, in turn, moved into the mold 18 transversely with respect to the longitudinal direction of the bristle tufts 7, such that a second mold cavity 23 is formed around the bristle tufts 7 which were covered during the first injection molding operation. The slides 22 once again move against the raised section 21 in order to seal off the mold cavity 23, namely opposite the area that is not supposed to be over-molded.

After the second plastic material has been injected into the second mold cavity 23 according to the partial view E of FIG. 10, the slides 22 are moved away, as it is shown in partial view F. The finished product can be transferred to a removal device while being held in the carrier part 8 and removed from the carrier part 8 (partial view H of FIG. 10).

Figure 12:
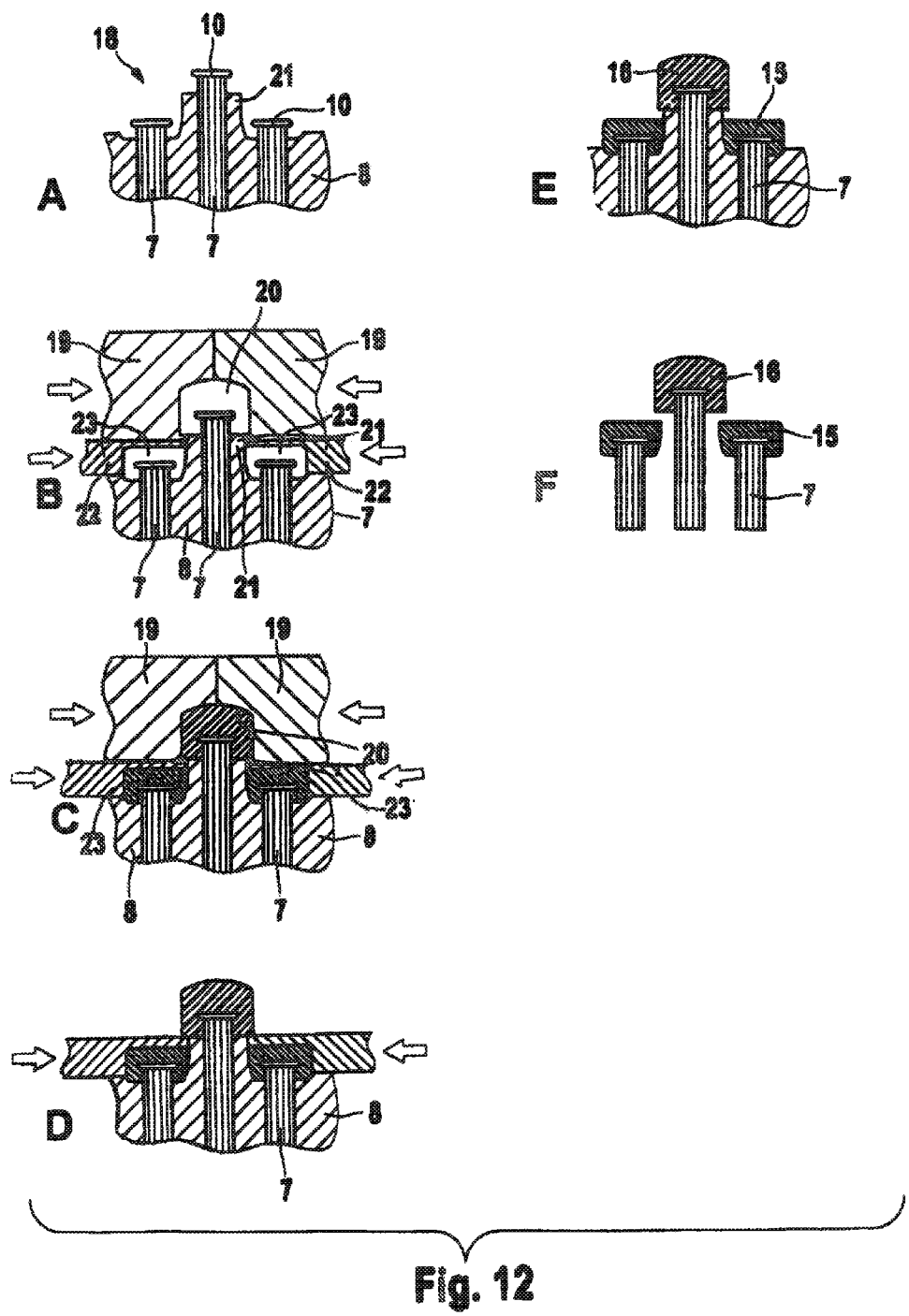
FIG. 12 shows schematic sectional views through three bristle tufts being held in a carrier part in different phases A to F of the multi-component injection-molding process, wherein the injection molding sections are formed simultaneously, and wherein the different illustrations show the different slides and the different sub-molding processes, mold parts and slides are movable transversely with respect to or in parallel to the longitudinal direction of the bristle tufts.

FIG. 12 shows an alternative embodiment, according to which the slides 19 and 22 are used simultaneously. As the partial view A in FIG. 12 shows, a carrier part 8 provided with bristle tufts 7 is first inserted into the injection mold 18. Different bristle tufts 7 being positioned for example with their ends in different planes. According to the partial view B in FIG. 12, slides 19 and slides 22 are then moved into in the mold 18 thereby forming a first mold cavity 20, which extends over the end of a first bristle tuft, and a second mold cavity 23, which extends over the end of second bristle tufts. Thus, the first and the second mold cavities 20, 23 separate the first and the second bristle tufts from each other. The slides 19 and 23 may be moved transversely with respect to the longitudinal direction of the bristle tufts. Alternatively, the slides 19 may be moved in parallel to the longitudinal direction of the bristle tufts. In addition, the slides 19 and 23 may move against a raised section 21 of the carrier part 8 which surrounds the bristle tuft 7 to be over-molded, cf. partial view B of FIG. 12, such that sealed mold cavities 20, 23 are formed around the end of the bristle tuft 7 to be over-molded. According to partial view C, the first plastic material is then injected into the first mold cavity 20 in order to over-mold the bristle tuft 7 placed therein and the second plastic material is injected into the second mold cavity 23 in order to over-mold the bristle tuft 7 placed therein. Injection into the first and second mold cavity 20, 23 may be performed simultaneously or successively.

As the partial view D of FIG. 12 shows, the slides 19 are then moved away and then the second slides 22 are moved away (partial view E of FIG. 12). Removal of the first and second slides as shown in partial view D and E of FIG. 12 can also be performed simultaneously. The finished product can be transferred to a removal device while being held in the carrier part 8 and removed from the carrier part 8 (partial view F of FIG. 12).

Figure 13:
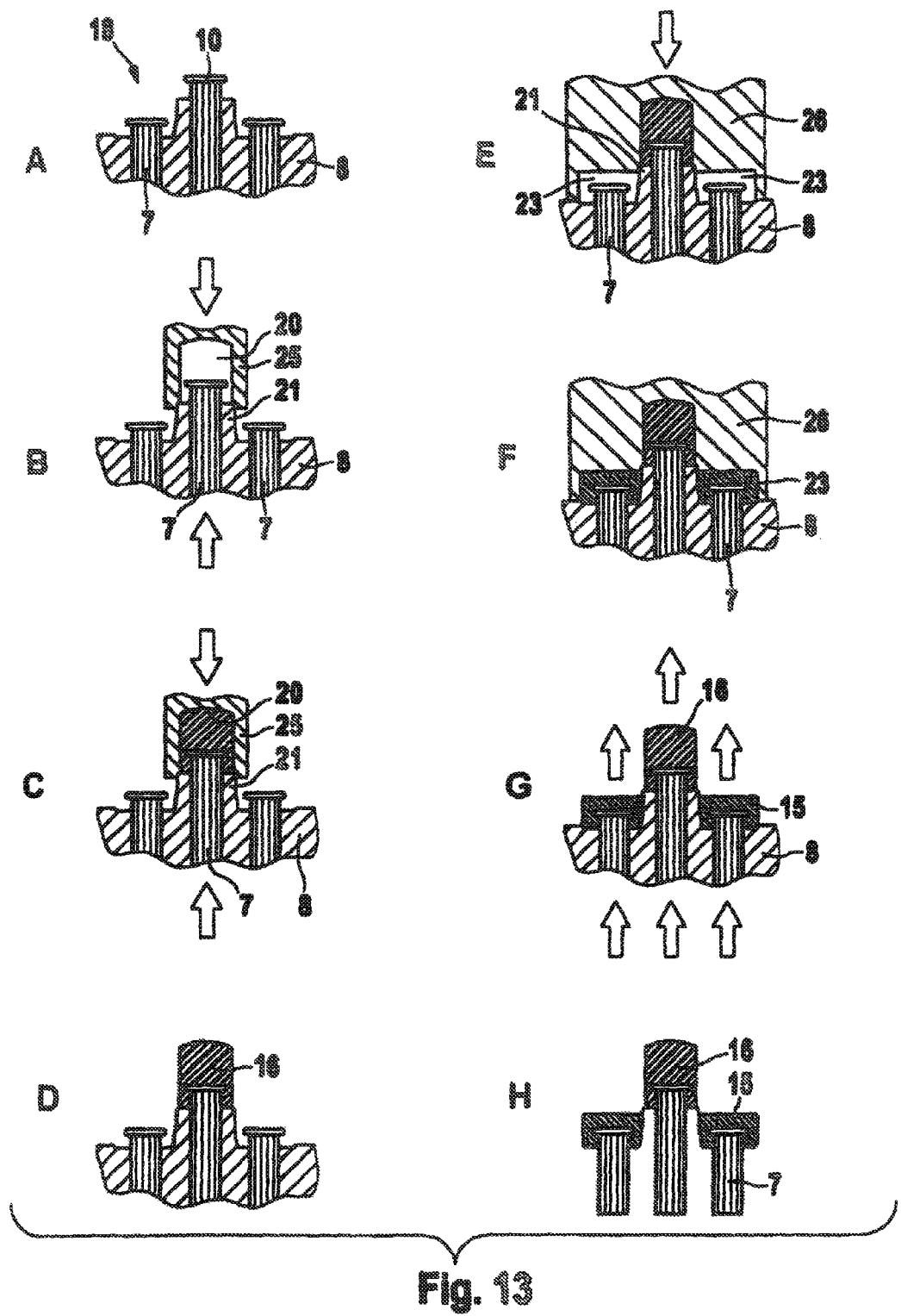
FIG. 13 shows schematic sectional views A to H through three bristle tufts being held in a carrier part in different phases of the multi-component injection-molding process, wherein the injection molding sections are formed successively; and wherein the different illustrations show the different sub-molding processes; mold parts are movable in parallel to the longitudinal direction of the bristle tufts.

In FIG. 13, another example for molding the first and second injection-molding sections is shown. The bristle tufts placed in the carrier part 8 are moved into the injection mold 18. According to partial view B in FIG. 13, one of the bristle tufts to be over-molded is initially covered by a mold part 25, which can optionally also be formed by a slide, is moved substantially parallel with respect to the longitudinal direction of the bristle tufts 7 onto the carrier part 8, such that a first mold cavity 20 encloses the tuft end to be over-molded and covers the other bristle tufts. In this case as well, the use of a protruding section 21 on the carrier part 8 is advantageous, against which the aforementioned mold part 25 is moved.

According to partial view D in FIG. 13, the mold part 25 is moved away after injection of the first plastic material—see partial view C in FIG. 13—and another mold part 26 is then moved onto the carrier part 8, again substantially parallel with respect to the longitudinal direction of the bristle tufts 7, in order to define a second mold cavity 23 which surrounds at least a second bristle tuft 7 and covers the previously over-molded part (see partial view E of FIG. 13).

After the second plastic material has been injected into the second mold cavity 23—see partial view F—the second mold part 26 is removed from the mold parallel to the longitudinal axis of the bristle tufts; see partial view G. While being held in the carrier part 8, the finished product is, in turn, transferred to a removal device, in which the brush head 4 is removed from the carrier part 8. Optionally, the bristle tufts 7 can be pushed out of the carrier part 8; see partial view H of FIG. 13.

Figure 14:
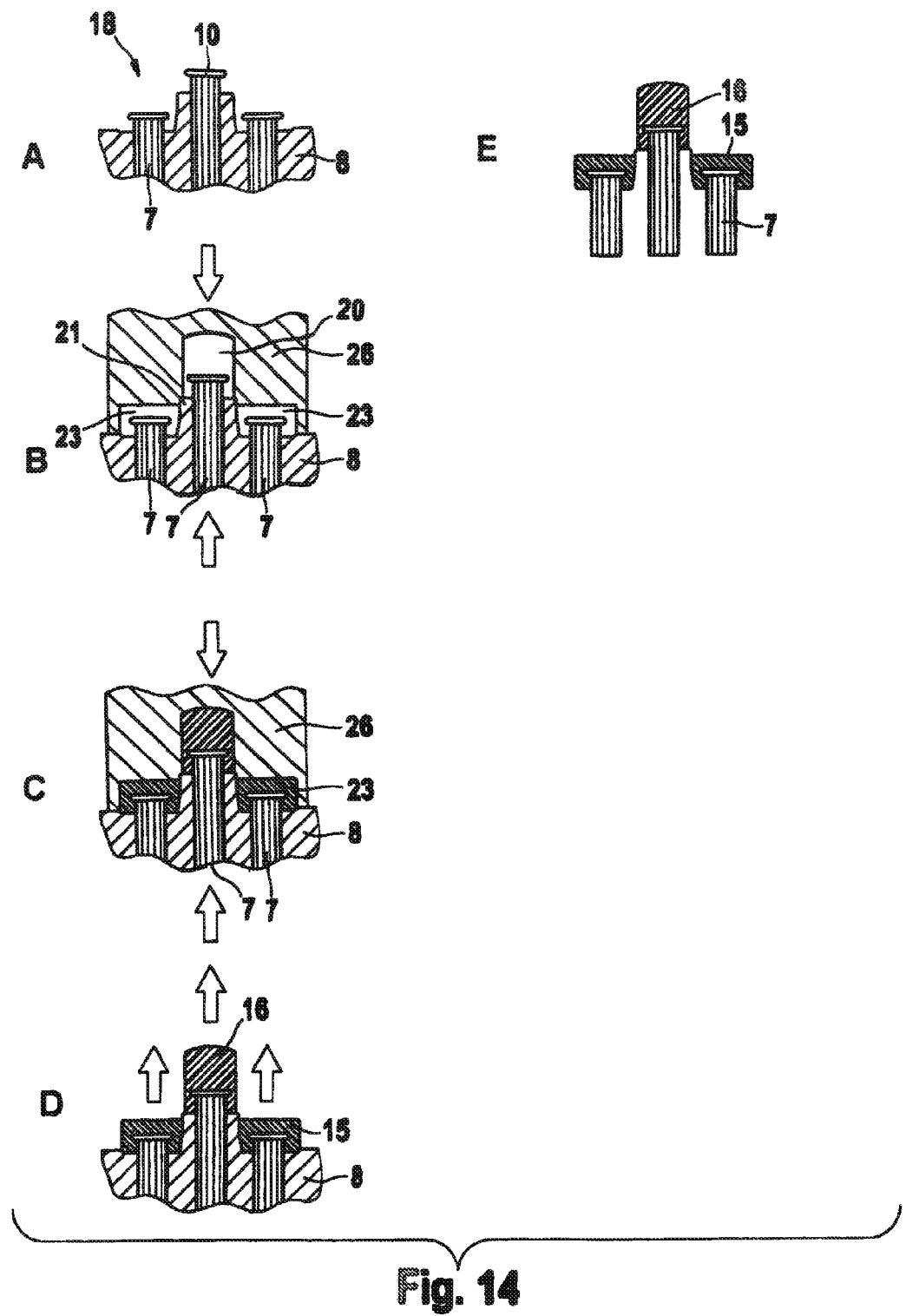
FIG. 14 shows schematic sectional views A to E through three bristle tufts being held in a carrier part in different phases of the multi-component injection-molding process, wherein the injection molding sections are formed simultaneously; and wherein the different illustrations show the different sub-molding processes; mold parts are movable in parallel to the longitudinal direction of the bristle tufts.

In FIG. 14, another example for molding the first and second injection-molding sections is shown. The bristle tufts placed in the carrier part 8 are moved into the injection mold 18. According to partial view B in FIG. 14, all bristle tufts to be over-molded are covered by a single mold part 26, which can optionally also be formed by a slide. The single mold part 26 is moved substantially parallel with respect to the longitudinal direction of the bristle tufts 7 onto the carrier part 8, such that a first mold cavity 20 and a second mold cavity 23 encloses the tuft end to be over-molded and separates the bristle tufts from each other. In this case as well, the use of a protruding section 21 on the carrier part 8 is advantageous, against which the aforementioned mold part 26 is moved. According to partial view D in FIG. 14, the mold part 26 is moved away after injection of the first and second plastic material (partial view C in FIG. 14). Then the bristle tufts 7 can be pushed out of the carrier part 8; see partial view E of FIG. 14.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for producing a brush head in which cleaning elements are over-molded at one of their ends using a plastic material, wherein a bristle carrier is formed at least partially during the over-molding process, wherein at least two different cleaning elements selected from the group consisting of different types of cleaning elements, distinctive cleaning elements of the same type and a combination thereof, are positioned successively or simultaneously in at least two different mold cavities such that the at least two different cleaning elements are over-molded using at least two different plastic materials in the at least two different mold cavities, wherein a first injection-molding section of the bristle carrier consisting of a first plastic material and a second injection-molding section of the bristle carrier consisting of a second plastic material are formed, wherein the surrounding area of a second one of the at least two different cleaning elements is separated from the injected plastic material during the over-molding of a first one of the at least two different cleaning elements by a first mold part, and wherein during the over-molding of a second one of the at least two different cleaning elements a previously over-molded first cleaning element and the injection-molding section molded thereon are separated from the injected plastic material by a second mold part.

2. The method according to claim 1, wherein the at least two different cleaning elements are held by at least one carrier part, wherein the at least one carrier part is a mold part which forms the negative mold of the bristle-side area of the brush head having hole-shaped receptacle recesses, in which the cleaning elements are located, and wherein the at least one carrier part forms a wall of the mold cavities, such that the ends of the cleaning elements protruding from the carrier part are over-molded in a multi-component injection molding process.

3. The method according to claim 2, wherein the first mold part is moved against the carrier part substantially transversely or in parallel to the longitudinal direction of the cleaning elements.

4. The method according to claim 3, wherein the first mold part is moved to be flush with the carrier part in the area of the cleaning elements.

5. The method according to claim 2, wherein the second mold part is moved against the carrier part substantially transversely or in parallel to the longitudinal direction of the cleaning elements.

6. The method according to claim 5, wherein the second mold part is moved to be flush with the carrier part in the area of the cleaning elements.

7. The method according to claim 2, wherein one or more slides are used to form a part of the first mold part.

8. The method according to claim 2, wherein one or more slides are used to form a part of the second mold part.

9. The method according to claim 2, wherein the first and the second mold part is one combined mold part.

10. The method according to claim 1, wherein the ends of the cleaning elements to be embedded in the bristle carrier are fused by subjecting them, either individually or in groups, to heat.

11. The method according to claim 10, wherein the cleaning elements are held by a carrier part in a predefined arrangement according to their desired distribution on the brush head.

12. The method according to claim 11, wherein, after the ends of the cleaning elements have been subjected heated, a punching tool is moved against the ends of the cleaning elements for reshaping the softened ends.

13. The method according to claim 12, wherein, the punching tool has a flat or a structured surface.

* * * * *